Oct. 28, 1969     F. J. BAGEMAN     3,474,678
WHEEL BALANCE METHOD
Filed Nov. 25, 1966
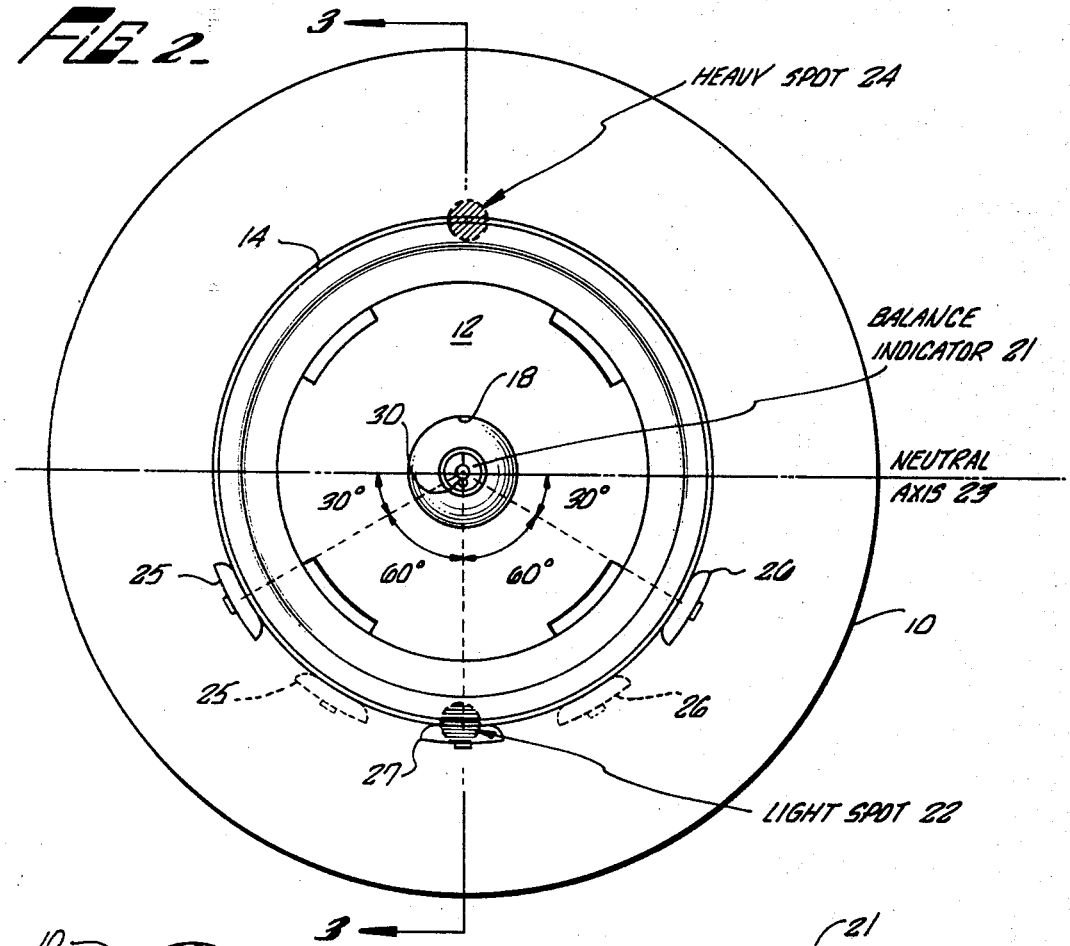
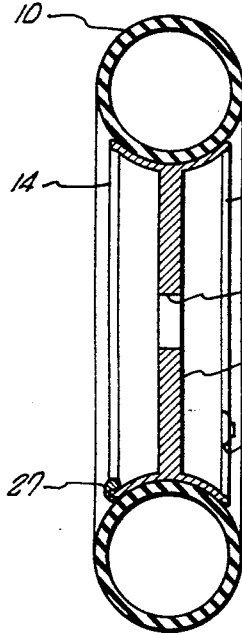
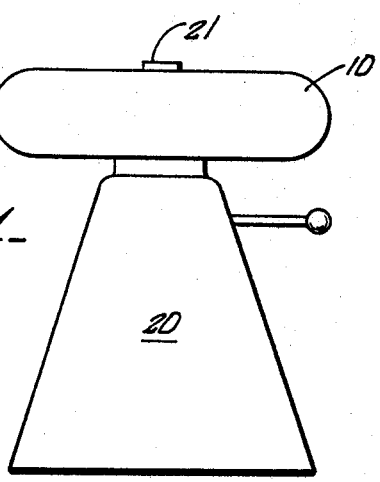
INVENTOR.
FRED J. BAGEMAN
BY
*Christie, Parker & Hale*
ATTORNEYS.

United States Patent Office 3,474,678
Patented Oct. 28, 1969

3,474,678
WHEEL BALANCE METHOD
Fred J. Bageman, 52 King's Court,
Santurce, Puerto Rico 00911
Filed Nov. 25, 1966, Ser. No. 596,972
Int. Cl. G01m 1/32
U.S. Cl. 73—483                                1 Claim

ABSTRACT OF THE DISCLOSURE

A method of balancing automotive wheels in which a wheel to be balanced is placed horizontally upon a balancing machine, such as a "bubble balancer," capable of indicating with accuracy the light spot of the wheel at which added balance weights are most effective to balance the wheel. Provide at least two and optimally three sets of three balance weights, two weights in each set being of equal mass and the third weight having a mass double the mass of either of the other two weights. The weights increase in mass in selected increments from set to set. One set of weights is placed on the rim of the wheel so that the heavy weight of the set is at the light spot and the smaller weights are spaced substantially 60 degrees on opposite sides of the light spot. The smaller weights are moved symmetrically toward or away from the light spot along the wheel rim, as indicated by the balancing machine, until a condition of wheel balance is achieved. Then the small weights are connected to the wheel rim on one side of the wheel at those locations corresponding to their adjusted positions at the time of balance, and the heavy weight is connected to the other side of the wheel in radial alignment with the light spot of the wheel. If the first set of weights has insufficient mass to produce balance, the adjustment procedure is repeated with the second, and if necessary, the third sets of weights.

---

This invention relates to a method for balancing vehicle wheels, and has particular reference to a three-weight method for statically balancing wheels on a pivot point wheel balancing machine without upsetting the dynamic balance of the wheel.

Pivot point balancing machines are well known and are commonly found in tire stores and automobile service centers where wheel balancing services are offered to the public. The general concept is that when an automobile wheel, having a tire mounted to it, is placed at rest horizontally on the pivot point machine, any static unbalance of the wheel will cause it to deviate from the horizontal, as indicated by a bubble (spirit) level on the machine. Conventionally, the wheel is statically balanced by the application of one or more small lead weights, called wheel weights or rim weights, to the rim of the wheel in a manner which causes the wheel to return to a horizontal plane and the bubble to center within the level. The place on the wheel at which the weight or weights should be applied is indicated in a general way by observing the highest point on the wheel rim when it is tilted from the horizontal by its unbalanced condition, this highest point being referred to as the "light spot" or "point of maximum effectiveness" of applied wheel weights. The light spot can also be located more accurately by observing the direction in which the bubble of the level is displaced from the center of the level. Each rim weight essentially is a piece of alloyed lead having a small steel clamp formed integrally with the weight. The clamp snaps over the rim of the wheel when hit by a hammer.

This invention provides a method of balancing an automobile wheel on the type of machine described above with great accuracy yet without disturbing the dynamic balance of the wheel; practice of the method, in the vast majority of cases, reduces the effects of dynamic unbalance. Adherence to the method described herein eliminates entirely the inaccurate, inadequate and detrimental results of balancing procedures relying upon a single weight to achieve wheel balance; single-weight procedures require the maintenance of a large inventory of a large number of different weights which vary progressively in size. Single-weight procedures inherently are ineffective to correct all static unbalance conditions encompassed by the multiple weight inventory, and such practices obviously change the dynamic balance of the wheel. The present method has no "gaps" relative to unbalance conditions below unbalance conditions which are so severe as to require corrective procedures going beyond the scope of techniques relying solely upon the addition of weight to the wheel. Also, the use of the present method reduces to a minimum the number of different weights which must be stocked to enable the balancing of the vast majority of unbalanced wheels. The method is characterized by its simplicity and reliability.

My United States Patent 3,085,442, owned by the assignee of the present invention, describes another three-weight method which is also effective to balance wheels efficiently. This invention, in its preferred form, results in a quicker balance than does the practice of the invention described in my prior patent. Also, this invention absolutely eliminates any possible chance that a wheel susceptible of being balanced by the addition of weights will not be properly balanced.

Briefly, the present method includes the steps of positioning a wheel to be balanced, including a tire mounted to the wheel, horizontally upon a wheel balancing machine and measuring, with a high degree of accuracy, any deviation of the plane of the wheel from the horizontal, thereby to locate the point on the wheel adjacent the rim of maximum balancing effectiveness of balancing weights applied to the wheel. The method also comprehends placing adjacent the exposed rim of the wheel a set of three balancing wheel weights consisting of two weights of unit mass and one weight of twice unit mass and arranging the weights with the one weight at the point of maximum effectiveness and the two weights disposed substantially 60 degrees from and on opposite sides of the point of maximum effectiveness. The two weights are then positionally adjusted symmetrically along the wheel rim toward the point of maximum effectiveness from their initial positions when the weights as initially positioned are ineffective to balance the wheel. The two weights are positionally adjusted symmetrically along the wheel rim away from the point of maximum effectiveness when the weights as initially positioned are effective to overbalance the wheel. When a condition of balance is obtained, i.e., when the wheel returns to a horizontal position, the two weights are connected to one rim of the wheel and the one weight is connected to the other rim at positions relative to the point of maximum effectiveness corresponding to the positions of the respective weights at the time balance is produced.

The above-mentioned and other features of the invention are more fully set forth in the following description of the invention, which description is presented with reference to the accompanying drawings, wherein:

FIG. 1 is a schematic elevation view of an automobile wheel resting on a conventional pivot point balancing machine;

FIG. 2 is a top plan view of the wheel on the machine; and

FIG. 3 is a schematic elevation view taken along line 3—3 of FIG. 2 showing the placement of rim weights on opposite sides of the wheel.

FIGS. 1 to 3 illustrate an automobile wheel having a tire 10 mounted on a wheel 12. The wheel has an outboard rim portion 14, an inboard rim portion 16, and a central aperture 18. The wheel rests on a conventional wheel balancing machine 20.

An upper portion of the balancing machine, which includes a balance indicator 21 usually in the form of a circular bubble level, extends through the central aperture of the wheel.

When the wheel is placed on the machine so that the plane of the wheel is in a horizontal position, any static unbalance of the wheel will cause the plane of the wheel to deviate from the horizontal. By observing the bubble level and the tilting of the wheel, the highest point of the wheel can be readily ascertained. This point is usually referred to as the "light spot" and is the theoretical position on the rim of the wheel where the application of a single weight of suitable size will bring the wheel into a perfect static balance such that the wheel returns to a horizontal position and the bubble 30 of the level indicator returns to the center of the level. The light spot is indicated in FIG. 2 by dotted circle 22. The wheel, theoretically, is divided into a heavy side and a light side by a neutral axis 23; the application of equal weights to the wheel at diametrically opposed locations along the neutral axis has no effect upon the static unbalance of the wheel. The wheel can be considered to possess a heavy spot 24 diametrically opposite from the light spot.

To balance wheel/tire combination 10, 12 according to this invention, a set of three rim weights 25, 26, 27 is placed upon the upper surface of the wheel on the tire just adjacent wheel rim portion 14. Weights 25–27 comprise one of at least two, and preferably three different sets of available weights and preferably is of the intermediate weight. Weights 25 and 26 are of equal size and weight and weight 27 weighs twice as much as either of weights 25 and 26. The weights are placed adjacent the wheel rim so that heavy weight 27 is at the light spot and weights 25 and 26 are spaced 120 degrees apart from each other 60 degrees from and on opposite sides of light spot 22, as shown in solid lines in FIG. 2.

The balancing process is carried out by adjusting weights 25, 26 symmetrically toward or away from each other relative to the light spot along the wheel rim as indicated by the state of the balancing machine after the initial placement of the weights. If the weights as initially placed upon the wheel are effective to overbalance the wheel, i.e., to cause the wheel to reverse its tilt on the balancing machine and to cause bubble 30 to move to the opposite side of the level indicator, weights 25 and 26 are moved symmetrically away from weight 27 toward, and even to, the neutral axis until a condition of wheel balance is obtained. On the other hand, if the weights as initially positioned upon the wheel are ineffective to balance the wheel, weights 25 and 26 are moved symmetrically toward weight 27 until a condition of wheel balance is obtained.

Once wheel balance is obtained, as when weights 25 and 26 occupy the positions depicted in dashed lines in FIG. 2, the positions of weights 25 and 26 angularly of weight 27 are indicated on the tread of tire 10 by chalk marks, for example. The wheel is removed from the balancing machine and weights 25 and 26 are connected to inboard rim portion 16 radially inwardly of the chalk marks. The wheel is then returned to the balancing machine and weight 27 is repositioned adjacent the light spot; some fine adjustment of this weight on the wheel may be required to achieve perfect static balance of the wheel. Weight 27 is then secured to wheel rim portion 14. Because the total added weight is equally distributed between opposite sides of the wheel, the dynamic balance of the wheel is not adversely affected, and in most cases a substantial contribution is made to the elimination of the effects of dynamic unbalance in the wheel.

It was noted above that preferably three sets of weights are available for balancing the wheel. The set referred to above comprises two weights of unit mass and one weight of twice unit mass. A second set of weights is constituted of two weights of one-half unit mass each and one weight of unit mass. The third set of weights is constituted of two weights of twice unit mass and one weight of four times unit mass.

If in using the first set of weights, the weights of unit mass can be placed in diametric opposition to each other along neutral axis 23 and the wheel is still overbalanced, the second set of weights is selected and the first set discarded. The second set of weights is placed on the wheel with the heavy weight at the light spot and the light weights 60 degrees on either side of the heavy weight. The above-described adjusting and weight securing procedures are then followed with these weights to produce a wheel having correct static balance. On the other hand, if the small weights of the first set can be placed at the light spot with the heavy weight of the set without balancing or overbalancing the wheel, the first set of weights is discarded and the third set is selected. The heavy weight of the third set is placed at the light spot and the small weights of this set are placed 60 degrees from and on opposite sides of the light spot. The adjusting and securing procedures are then performed as described above.

If desired, the wheel can be balanced effectively by starting with the lightest set of weights and working through the second to the third set, if necessary. Such a procedure is not preferred, however, since it is not as efficient, in terms of time expended, as the method described above.

If all four weights of the third and heaviest set of weights can be collected at light spot 22 without balancing or overbalancing the wheel (a rare condition), it is known then that the wheel cannot properly be balanced merely by adding balance weights to the wheel; to balance such a severely unbalanced wheel, it is best to rotate the tire about 180 degrees on the wheel and to recommence the above-described procedure.

To assure the best possible balance, the minimum amount of weight should be added to the wheel. The procedures described assure, consistent with the competing consideration that a minimum stock of weights should be inventoried for economic reasons, that the least possible weight is applied to an unbalanced wheel to achieve balance, and this is also economically important. Also, the procedure described assures that the wheel will be balanced if it can in fact be balanced safely, that is, the procedure described does not skip any weight arrangement effective to balance the wheel as is the case with procedures which rely upon a single weight to perfect balance. Because the weights used to accomplish balance are equally distributed on opposite sides of the wheel, the dynamic balance of the wheel is essentially undisturbed and the effect of any dynamic unbalance in the wheel is reduced in the vast majority of cases.

What is claimed is:

1. A method for balancing an automobile wheel having a tire mounted thereto comprising the steps of positioning the wheel horizontally on a wheel balancing machine, measuring with a high degree of accuracy any deviation of the plane of the wheel from the horizontal thereby to locate the point on the wheel adjacent the rim thereof of maximum balancing effectiveness of balancing weights applied to the wheel, providing three sets of balancing rim weights, the first weight set consisting of two weights of unit mass and one weight of twice unit mass, the second weight set consisting of two weights of twice unit mass and one weight of four times unit mass, the third weight set consisting of two weights of four times unit mass and one weight of eight times unit mass, placing on one rim of the wheel the second set of three balancing rim weights and arranging the weights with the one weight of the set at the point of maximum effectiveness and the two lighter weights of the set disposed substantially 60 degrees from and on opposite sides of the point of maximum effectiveness, adjusting said two weights symmetrically along the rim toward the point of maximum effectiveness from their initial positions until the wheel is balanced when the weights in the initial positions thereof are ineffective to produce balance of the wheel and adjusting said two weights symmetrically along the rim away from the point of maximum effectiveness from their initial positions when the weights in the initial positions thereof are effective to overbalance the wheel, replacing the second set of weights with the third set if the second set is insufficient to produce balance or overbalance when collected at the point of maximum effectiveness, repeating the placing, arranging and adjusting steps with the weights of the third set to produce balance, and replacing the second set of weights with the first set if the second set is ineffective to produce balance when the two weights thereof are disposed essentially diametrically opposite each other equidistant from the point of maximum effectiveness, repeating the placing, arranging and adjusting steps with the weights of the first set to produce balance, and connecting the two weights of the set which actually produces balance to one rim of the wheel and the one weight of the same set to the other rim of the wheel at positions relative to the point of maximum effectiveness corresponding to the positions of the respective weights of such set at the time balance is produced.

References Cited

UNITED STATES PATENTS

| | | | |
|---|---|---|---|
| 2,592,804 | 4/1952 | Holl | 73—484 |
| 2,697,345 | 12/1954 | Currier | 73—487 |
| 3,085,442 | 4/1963 | Bageman | 73—483 |
| 3,177,725 | 4/1965 | Johnson | 73—480 |

JAMES J. GILL, Primary Examiner